United States Patent [19]

Jensen

[11] Patent Number: 5,033,941
[45] Date of Patent: Jul. 23, 1991

[54] METHOD FOR ASSEMBLING ROTORS WITHOUT FIXTURES

[75] Inventor: Gunther T. Jensen, Tyler, Tex.

[73] Assignee: American Standard Inc., New York, N.Y.

[21] Appl. No.: 485,683

[22] Filed: Feb. 27, 1990

[51] Int. Cl.$^5$ .............................................. F04B 35/04
[52] U.S. Cl. .................................. 417/415; 29/888.02; 29/447
[58] Field of Search ...................... 417/415; 29/888.02, 29/447

[56] References Cited

U.S. PATENT DOCUMENTS

| | | | |
|---|---|---|---|
| 3,208,667 | 9/1965 | Boettcher | 230/207 |
| 3,288,357 | 11/1966 | Comstock et al. | 230/208 |
| 3,447,738 | 6/1969 | Valbjorn | 230/58 |
| 3,765,801 | 10/1973 | Ayling | 417/372 |
| 4,115,039 | 9/1978 | Schjelde et al. | 417/363 |
| 4,605,362 | 8/1986 | Sturgeon et al. | 418/63 |
| 4,676,075 | 6/1987 | Shiibayashi | 62/469 |
| 4,762,471 | 8/1988 | Asanuma et al. | 417/372 |
| 4,768,936 | 9/1988 | Etemad et al. | 418/55 |
| 4,840,545 | 6/1989 | Moilanen | 417/301 |

Primary Examiner—Leonard E. Smith
Assistant Examiner—Alfred Basichas
Attorney, Agent, or Firm—William J. Beres; William O'Driscoll

[57] ABSTRACT

A method of forming a clearance gap between a shrink fit rotor and a motor housing comprising the steps of heating the rotor until the rotor expands, sliding the heated rotor over a shaft having an axis, bringing the heated rotor into contact with at least one small protrusion on the surface of the motor housing, causing the protrusion to expand toward the heated rotor by transferring heat from the heated rotor to the protrusion, allowing the motor and the protrusion to cool whereby a clearance gap is formed between the rotor and the motor housing as the motor housing cools, and hermetically enclosing the rotor, the motor housing and the shaft within a compressor shell.

12 Claims, 1 Drawing Sheet

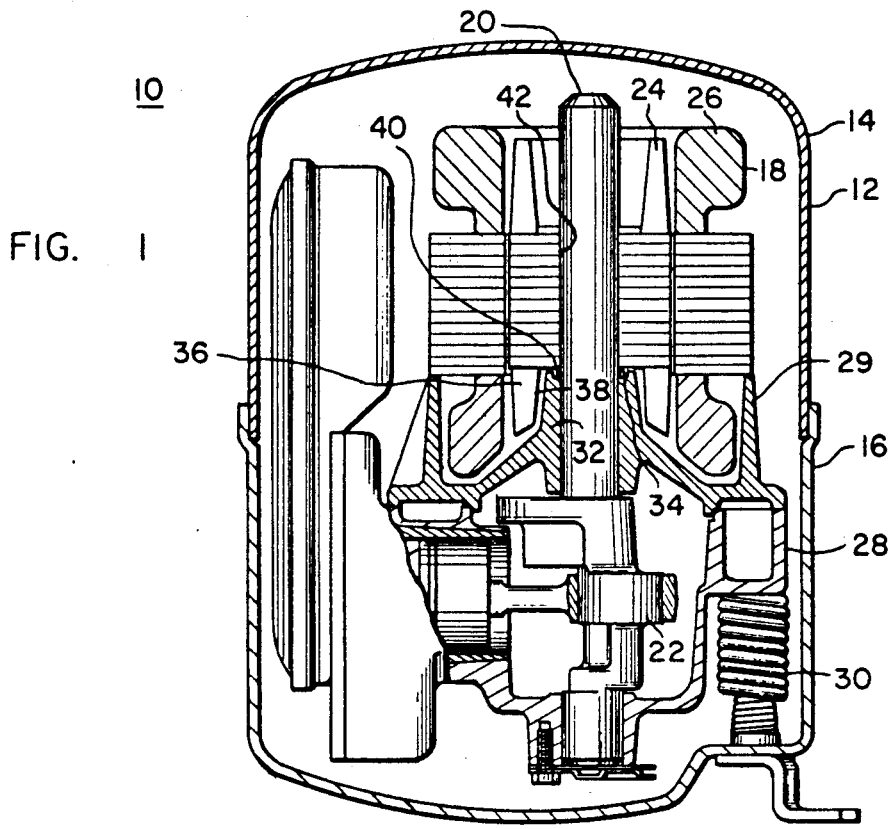
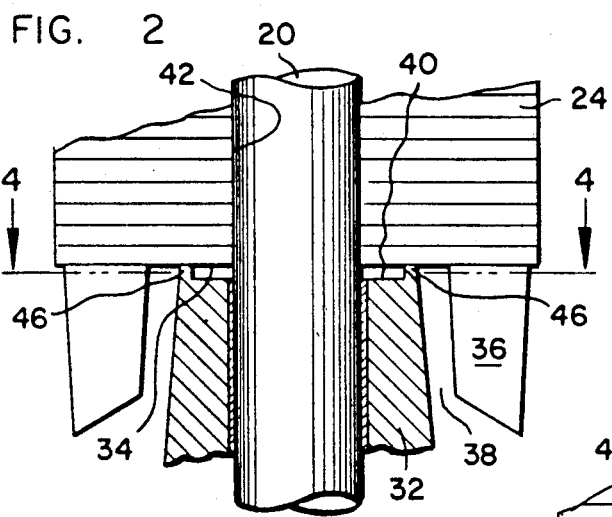
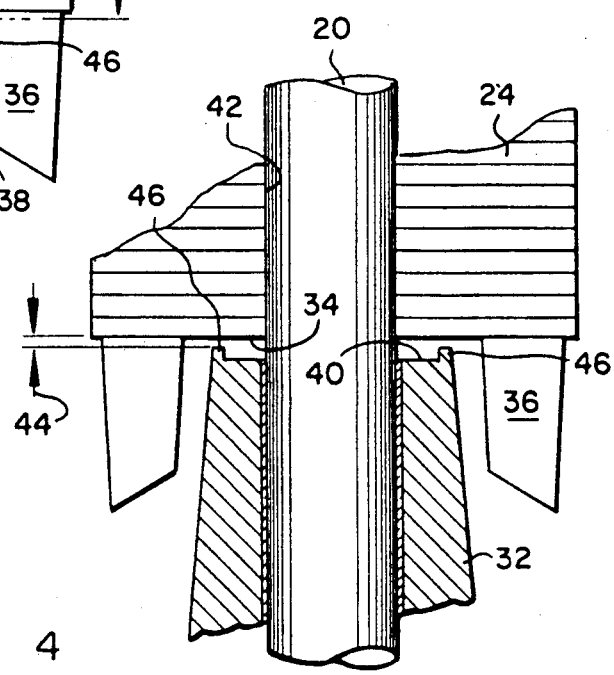
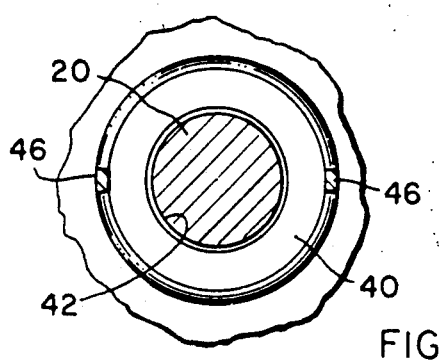

METHOD FOR ASSEMBLING ROTORS WITHOUT FIXTURES

TECHNICAL INFORMATION

The present invention is directed to a method of assembling compressor motors for refrigeration systems, and more particularly, to a method of assembling a shrink fit rotor to a crankshaft which does not require temporary or permanent fixtures to space the rotor from the compressor motor housing during assembly.

BACKGROUND OF THE INVENTION

The conventional method of assembling a shrink fit rotor to the crankshaft is to heat the rotor and assemble it over the crankshaft. Various temporary or permanent fixtures have been required to hold the rotor in a position spaced from the motor housing until the rotor cools sufficiently to shrink fit onto the crankshaft. Without these various temporary or permanent fixtures the rotor will abrade the top of the motor housing when the rotor is rotated.

Many prior art compressor assemblies show motor bearing housings having a portion which extends into proximity to the rotor, including U.S. Pat. Nos. 3,208,667 to Bettcher; 2,288,357 to Comstock; 3,447,738 to Valbjorn; 3,765,801 to Ayling; 4,605,362 to Sturgeon; 4,676,075 to Shiibayashi; 4,762,471 to Asanuma; 4,768,936 to Etemad, and 4,840,545 to Moilanen. All of the foregoing require temporary or permanent fixtures to space the motor housing from the rotor during assembly.

SUMMARY OF THE INVENTION

It is an object of the present invention to solve the problems the prior art has had in assembling shrink fit compressor motors to motor shafts.

It is a further object of the present invention to form a clearance gap between the rotor and the motor bearing housing without the use of permanent or temporary fixtures.

These and other objects of the present invention are accomplished by the disposition of a heated motor rotor or the compressor drive shaft and by resting the heated rotor on protrusions extending from a motor housing. The protrusions expand as a result of the heat transferred to them from the rotor and push the rotor away from the housing. The rotor shrinks onto the shaft and the protrusions contract as the assembly cools with the result that a gap of a predetermined dimension is created between the motor and the rotor housing.

BRIEF DESCRIPTION OF THE DRAWINGS

FIG. 1 is a cross-sectional view of a compressor which incorporates the present invention.

FIG. 2 is an enlarged view of the present invention during assembly.

FIG. 3 is an enlarged view of the present invention after assembly.

FIG. 4 is a top view of the axially extending motor housing portion of the present invention taken along line 4—4 of FIG. 2.

DETAILED DESCRIPTION OF THE INVENTION

FIG. 1 shows the present invention incorporated into a hermetic compressor 10. However, the invention is applicable to the assembly of any shrink fit rotor which is juxtaposed in close proximity to a motor housing or the like by gravity.

The compressor 10 includes a shell 12 which includes an upper half 14 and a lower half 16. The compressor shell 12 encloses a reciprocal compressor 22 and a motor 18 which shares a common crankshaft 20 with the reciprocal compressor 22. The invention is relevant to more than reciprocal compressors, and can be envisioned in connection with any hermetic compressor including scroll, centrifugal and screw compressors.

The motor 18 is a conventional induction motor including a rotor 24 which is conventionally shrink fit to the crankshaft 20, and a stator 26 which is supported within the compressor shell 12 by a cylinder frame 28 and a motor housing 29. The cylinder frame 28 is conventionally supported in the compressor shell 12 by vibration absorber assemblies 30. The cylinder frame 28 supports the motor housing 29 and the compressor 22. The motor housing 29 has an axially extending motor bearing housing portion 32 which rotatably supports the crankshaft 20.

The rotor 24 includes a radial portion 34 which extends from the crankshaft 20. The rotor 24 also includes an axially extending rotor arm 36 which is radially spaced from the crankshaft 20 by the rotor shoulder 34 and a radial space 38. The motor housing portion 32 generally extends into the radial space 38 between the axially extending rotor arm 36 and the crankshaft 20. The motor housing 29 is cast in aluminum in the preferred embodiment and the motor housing portion 32 includes an end 40 in proximity to the radial portion 34.

During assembly the rotor 24 is heated to a temperature of approximately 550° F. so that the diameter of a rotor bore 42 expands sufficiently to slide over the crankshaft 20. In the prior art permanent or temporary fixtures are used to form a clearance gap 44 between the radial portion 34 and the end 40 of the motor housing portion 32 while the rotor 24 cools. If the clearance gap 44 is not sufficiently sized and the rotor 24 is allowed to contact and abrade the motor bearing housing portion 32, varying sized debris will break from either the rotor 24 or the motor housing portion 32 and damage portions of the compressor 10 including most particularly the oil lubrication system (not shown).

In the preferred embodiment of the present invention as is best shown in FIGS. 2, 3 and 4, two small protrusions 46 are cast on the end 40 of the motor housing portion 32 when the motor housing 29 is cast. After finishing these protrusions have radial dimensions of approximately 0.18 inches by 0.09 inches and extend approximately 0.09 inches axially from the end 40 of the motor bearing housing portion 32. These dimensions can vary but the axial dimension and the radial dimensions should be such that the size of the protrusions are minimized with respect to the size of the motor housing portion 32.

During assembly the motor shoulder 34 of the heated rotor 24 is brought into contact with the protrusions 46. The heat of the rotor 24 is transferred to the protrusions 46, causing them to expand approximately 0.001 inches. As the rotor 24 cools, it shrinks in place on the crankshaft 20. Thereafter, the protrusions 46 also cool and contract leaving a clearance gap 44 of approximately 0.001 inches as is shown in FIG. 3. Neither temporary nor permanent fixtures are required to form this clearance gap 44. As previously mentioned, there is some variance allowed in the dimensions of the protrusions 46. However, if the radial surface area of the protrusions 46 is large, the heat transferred from the rotor 24 will dissipate into the motor housing portion 32 without sufficiently expanding the protrusions 46. In the preferred embodiment, the radial surface are of the end 40 of the motor bearing portion 29 is approximately 2.1476 in$^2$ while the combined radial surface area of both protrusions 46 is 0.0324 in$^2$. This is a difference in radial surface area of approximately two orders of magnitude.

The invention has a further advantage that if the rotor 24 is not spaced correctly and the protrusions 46 come into contact with the rotor 24, any debris formed will be limited to the size of the fairly minute protrusions 46. From the foregoing it is apparent that substantial advantages over the prior art are provided by the present invention.

Although the preferred embodiment is described above in connection with two protrusions 46, it is apparent that many alterations and modifications may be made without departing from the subject invention. Such modifications could include the use of only one protrusion, or the use of many protrusions of varying sizes and shapes. Additionally, the motor housing portion 32 could be modified so the end 40 and the protrusions 46 are located at a greater radial distance from the crankshaft 20. It is intended that all such alterations and modifications be considered within the spirit and scope of the invention as defined in the following claims.

What is claimed and desired to be secured by Letters Patent of the United States is:

1. A compressor for a refrigeration system comprising:
    a compressor shell;
    means, within the compressor shell, for compressing refrigerant vapor;
    a crankshaft rotatably supported by a motor housing and rotatably connected to the compressor means;
    the motor housing supporting a motor including a stator and a rotor, the rotor including a portion engaging the crankshaft and a radial portion facing the motor housing; and
    means for supporting the motor housing and the compressor within the compressor shell;
    wherein the motor housing has at least one small integrally formed, axially extending protrusion on an end of the motor housing facing the radial portion of the rotor, and
    wherein during fabrication the protrusion supports the rotor against gravity and after fabrication the protrusion contracts away from the rotor to leave a clearance gap between the motor housing and the radial portion of the rotor.

2. The compressor of claim 1 wherein the clearance gap is approximately 0.001 inches.

3. The compressor of claim 1 wherein the radial surface area of the at least one axially extending protrusion is approximately two orders of magnitude less than the radial surface area of the end of the motor housing.

4. The compressor of claim 1 wherein the protrusion extends axially approximately 0.09 inches from the end of the motor housing toward the radial portion.

5. The compressor of claim 4 wherein the dimensions of the protrusion in the radial directions are approximately 0.18 inches by 0.09 inches.

6. The compressor of claim 1 wherein the compressor means includes a reciprocating compressor, the motor housing includes a plurality of said protrusions, and the plurality of protrusions are symmetrically spaced about the crankshaft.

7. A method of forming a clearance gap between a shrink fit rotor and a motor housing comprising the steps of:
    heating the rotor until the rotor expands,
    sliding the heated rotor over a shaft having an axis,
    bringing the heated rotor into contact with at least one small protrusion on the surface of the motor housing,
    causing the protrusion to expand toward the heated rotor by transferring heat from the heated rotor to the protrusion,
    allowing the motor and the protrusion to cool whereby a clearance gap is formed between the rotor and the motor housing, and
    hermetically enclosing the rotor, the motor housing and the shaft within a compressor shell.

8. The method of claim 7 including allowing the protrusion and the rotor to cool and to form a clearance gap of approximately 0.001 inches.

9. The method of claim 8 including heating the rotor to a temperature of approximately 550° F.

10. The method of claim 9 including the further step of forming at least one small protrusion having radial dimensions of approximately 0.18 inches by 0.09 inches and an axial dimension of approximately 0.09 inches on the surface of the motor housing.

11. The method of claim 10 wherein the step of forming at least one protrusion on the surface of the motor housing includes the step of forming a multiplicity of small protrusions on the surface of the motor housing.

12. A method of assembling a rotor and a motor housing on a common shaft for use in the compressor of a refrigeration system comprising the steps of
    disposing a compressor portion within a shell,
    mounting, on the compressor portion, a motor housing having at least one small protrusion,
    rotatably supporting a shaft within the motor housing,
    heating a rotor a sufficient amount to expand an internal bore of the rotor to a size greater than the diameter of the shaft,
    sliding the heated rotor onto the shaft and into contact with the protrusion on the motor housing,
    transferring heat from the heat rotor to the protrusion to expand the protrusion toward the rotor and move the rotor away from the motor housing a predetermined distance,
    allowing the heated rotor and the protrusion to cool and to leave a clearance gap between the rotor and the protrusion.

* * * * *